United States Patent [19]

Boyer et al.

[11] Patent Number: 5,387,774
[45] Date of Patent: Feb. 7, 1995

[54] SPOT RESISTANCE-WELDING ELECTRODE; CONTACT TIP FOR SUCH AN ELECTRODE; MACHINE FOR EXCHANGING THESE TIPS

[75] Inventors: Jean-Noël Boyer, Mettray; Patrick Le Gall, Fondettes, both of France

[73] Assignee: A R O, Chateau Du Loir, France

[21] Appl. No.: 994,584

[22] Filed: Dec. 21, 1992

[30] Foreign Application Priority Data

Dec. 20, 1991 [FR] France ................ 91 15893

[51] Int. Cl.6 .................................. B23K 11/10
[52] U.S. Cl. ................... 219/86.33; 219/86.8; 219/117.1; 219/120
[58] Field of Search .................. 219/86.33, 86.8, 86.25, 219/119, 120, 85.19, 117.1

[56] References Cited

U.S. PATENT DOCUMENTS

| | | | |
|---|---|---|---|
| 2,446,932 | 8/1948 | Johnson | 219/120 |
| 4,071,947 | 2/1978 | Nippert | 219/119 |
| 4,288,024 | 9/1981 | Nippert | 219/119 |
| 4,345,136 | 8/1982 | Nippert | 219/120 |
| 4,588,870 | 5/1986 | Nadkarni et al. | 219/119 |
| 4,794,221 | 12/1988 | Takabe et al. | 219/86.8 |
| 4,935,595 | 6/1990 | Fuse | 219/86.25 |
| 5,073,692 | 12/1991 | Jackson et al. | 219/86.8 |

FOREIGN PATENT DOCUMENTS

| | | | |
|---|---|---|---|
| 2632251 | 1/1978 | Germany | 219/120 |
| 3605099 | 10/1987 | Germany | |
| 63-230280 | 9/1988 | Japan | |
| 3-184673 | 8/1991 | Japan | 219/86.8 |
| 3-285778 | 12/1991 | Japan | 219/119 |
| 4-52083 | 2/1992 | Japan | 219/119 |
| 4-89182 | 3/1992 | Japan | 219/119 |
| 575742 | 4/1946 | United Kingdom | |

OTHER PUBLICATIONS

Patent Abstracts of Japan, vol. 8, No. 186, JP-A-59076684 (1 May 1984).

*Primary Examiner*—Geoffrey S. Evans
*Attorney, Agent, or Firm*—Larson and Taylor

[57] ABSTRACT

This welding electrode is one wherein the welding cap 3 of the electrode body 1 carries a contact tip 4 which is securely fastened to it by brazing. Thus, the replacement of this contact tip can be carried out very easily by stopping the circulation of the cooling water in the electrodes, by applying them to a resistive metal sheet and by passing through them a current of sufficient intensity to cause the brazing ring 5 which securely fastens the contact tip 4 to the welding cap 3 to melt. The removal of a worn tip 4 and the replacement of a new tip 4 are carried out in the same manner. The welding electrode also has a contact tip 4 provided with a brazing ring 5, as well as to an automatically operating machine for replacing the tips 4 away from the line for welding the metal sheets T.

18 Claims, 3 Drawing Sheets

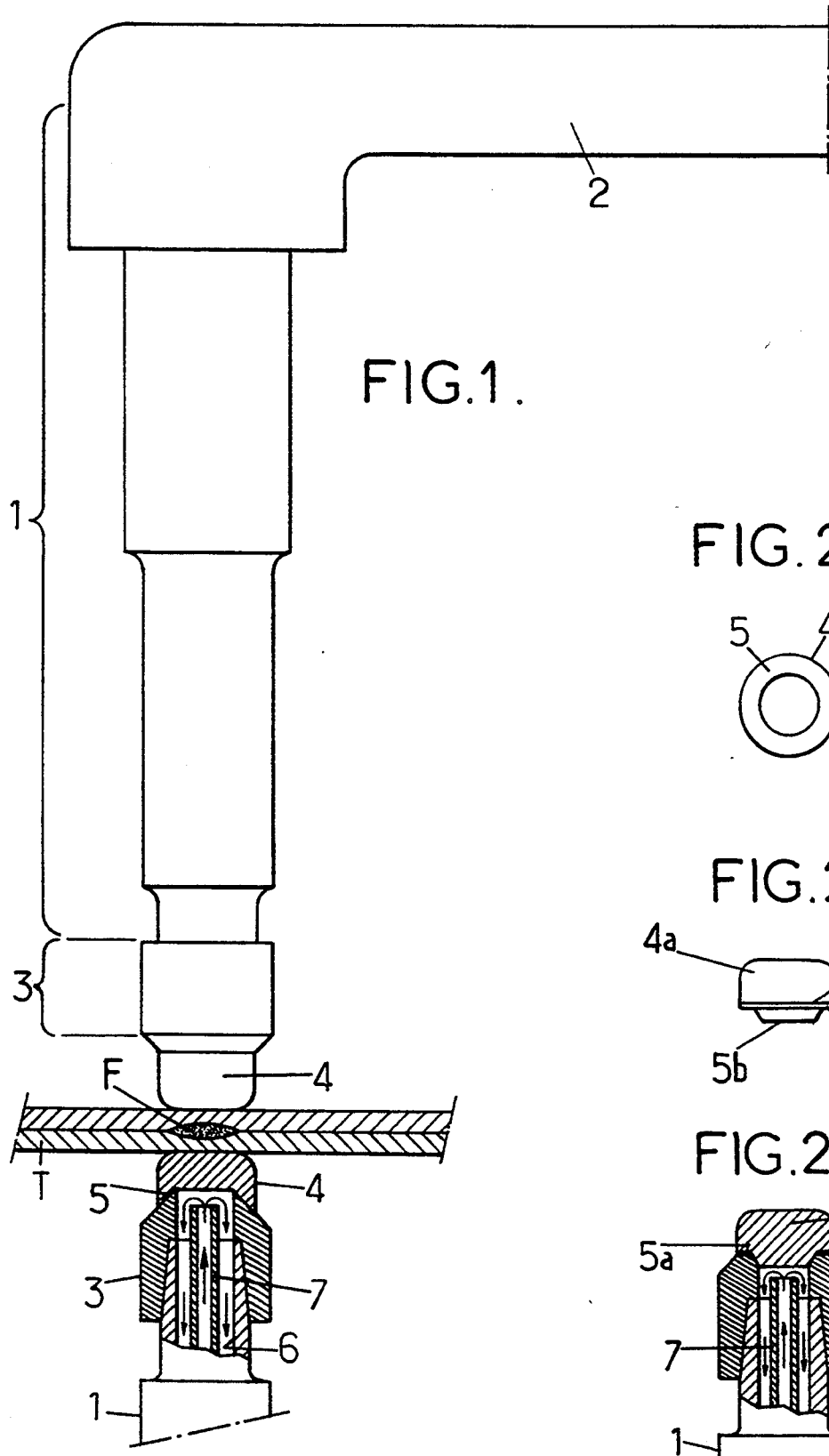

SPOT RESISTANCE-WELDING ELECTRODE; CONTACT TIP FOR SUCH AN ELECTRODE; MACHINE FOR EXCHANGING THESE TIPS

The present invention relates to a spot resistance-welding electrode of the type comprising an electrode body suitable for being mounted on a support arm and for being connected to a high intensity welding current source, as well as to a cooling water supply circuit, this electrode further comprising a welding cap securely fastened to the end of said body, this cap itself having a consumable contact tip whose role is to ensure contact with the metal sheets to be welded and to transmit to them the welding current pressure and welding current intensity.

Such an electrode (carried, for example, by a gripper maneuvered by a robot), in particular its welding cap, is subjected to mechanical and thermal stresses, and consequently to significant wear, due to the fact that its tip is placed in contact repeatedly and under pressure with the metal sheets to be welded, and due to the great intensities of the electric current which passes through it, which may be of the order of 10,000 A under low voltage. This current brings about a point fusion of the metal of these metal sheets, and the tip of the electrode may therefore be subjected to very significant temperature rises, notwithstanding the cooling supplied by the water circulating in the aforementioned circuit.

There are grounds for considering, in this connection, that the dynamics of formation of a weld nugget and its reproducibility over time are very dependent on the quality of the contact between the electrodes and the metal sheets. Now, this contact degrades very rapidly with time according to various processes; firstly, there is a geometric degradation, caused by the repeated impacts due to the welding gripper closing and due to the fact that the electrodes are not always perfectly perpendicular to the metal sheets (robot programming). The high release of heat which occurs during welding, causing a deterioration in the mechanical properties of the copper, means that the contact surface area tends to increase. Since the surface of metal sheet through which the welding current passes becomes greater, the same welding current no longer makes it possible to obtain fusion in an identical time.

Next, there is a metallurgical degradation due to the oxidation of the contact surfaces caused by the rise in temperature and the transfer of metal oxides between the metal sheets and the electrodes. During the welding of coated metal sheets (which are zinc-coated or aluminum-coated, etc.), the coating metal is transferred to the electrode and a layer of zinc or of aluminum is formed which considerably modifies the contact resistances between the electrodes and the metal sheets, and may even bring about bonding or welding between the electrodes and the metal sheets.

In order to solve these problems, numerous remedies have been put in place: it was firstly envisaged to clean the electrodes by lapping at a given time interval, but lapping never makes it possible to recover the geometric quality of the new electrode. In addition, the cost of this operation, including automation of the method, the purchase and putting in place of the equipment and in certain cases the loss in productivity, is relatively high.

It was also envisaged to progressively increase the welding current to take into account the degradation of the electrodes, but this is an extremely empirical method, which certainly makes it possible to improve the situation, but nevertheless fails to ensure a satisfactory evenness of quality because the processes of degradation of the electrodes are extremely complex and not very repetitive.

It is therefore necessary, especially when the welding rate is high, to regularly and frequently replace the electrode body, and especially the welding cap. Thus, the welding cap may have to be changed several times per day, and the electrode body once every ten or twenty changes of cap.

Since, for this reason, it may be necessary to unfasten the welding cap from the electrode body, a tapered press fit is often used between the two.

For high production rates, it may be envisaged to automate the changing of caps or electrodes, but this is a very complex and inconvenient operation.

The object of the present invention is to eliminate all these drawbacks of the prior art and to make it possible to automatically and easily change the contact tips of the welding caps at low cost.

For this purpose, an electrode in accordance with the invention, of the general type defined at the beginning, will essentially be one wherein said contact tip of the welding caps is a distinct component of the cap and is connected to this cap by brazing, the current necessary for melting the brazing being supplied by said welding current source itself, while the supply of cooling water is momentarily stopped.

Thus, by virtue of the invention, it is no longer necessary to change the entire welding cap, but only its contact tip, the actual cap remaining securely fastened to the electrode body. Furthermore, changing of this contact tip may be done without undoing or refitting the press fit because the secure fastening between this contact tip and the actual cap is provided by brazing.

In order to withdraw the contact tip, it will therefore be sufficient to melt the brazed connection between it and the cap by passing the high intensity current through the electrode, after having cut off the circulation of the cooling water therein, in order to facilitate the fusion of the brazing, and to be able thus to limit this intensity; in order to put a new contact tip back in place, it will be sufficient to proceed likewise so as to cause a brazing ring provided on this tip to melt; the mechanical installation and removal operations will, in this way, be reduced to their simplest form; they may be performed very rapidly, and without in any way penalizing the productivity of the sheet assembly line.

Provision may be made for said welding cap itself to be fixed in a removable fashion to the end of said body, for example by a tapered press fit, or, to the contrary, for said welding cap to form an integral part of the electrode body, in which case it can only be changed at the same time as this body, but much less frequently than according to the prior art.

The brazing on the replacement contact tip may be in the form of brazing paste or in the form of an attached brazing roundel. According to one variant, a flat brazing roundel may be held on a contact tip by spot welds or by clipping or similar fixing means. It could also be envisaged for the contact tip and/or the welding cap to be coated by electrolysis or by chemical deposition of the necessary added metal, for example zinc or tin. Centering of the conical or cylindrical type, for example, may also be envisaged in order to facilitate the positioning of the welding cap and the contact tip on one another.

Moreover, it goes without saying that the electrode body may, as known per se, be inclined, bent, etc.

In any case it can be seen that the invention will also relate to a contact tip for an electrode of the type which has just been described, and that such a tip may be one provided with a brazing ring. It may additionally be one wherein said brazing ring is formed on a conical part or the like, allowing it to be assembled with a part of complementary shape provided on said welding cap, or directly on said electrode body.

Provision may also be made for this contact tip to carry, centrally and internally, a conical and/or helical deflecting peg, this being provided in the case in which a tube provided internally within the electrode for bringing the water of the cooling circuit to the tip of said electrode emerges directly on the bottom of said contact tip. This arrangement of the invention, in this case, makes it possible to increase the effect of convection in the vicinity of this end, by better distributing this water over this entire bottom of the contact tip.

However, it goes without saying that this arrangement could equally well be dispensed with, and a welding cap or electrode body with a closed tip used. This arrangement would then have the advantage over the preceding one of not requiring the cooling water circuit to be drained before the contact tip is withdrawn or installed.

The invention further relates to a machine designed specially for exchanging contact tips which have just been described on electrodes which are also in accordance with the invention.

Advantageously, such a machine may be one which comprises a revolving platter combined with stepwise drive motor means and equipped, on either side of a resistive sandwich plate, with a number of housings suitable for receiving said contact tips, the welding gripper thus being able to be moved away from its normal welding position and brought into a re-equipment position for which the welding caps of the electrodes come to be positioned respectively facing free housings of said platter, following which the corresponding worn contact tips, once unfastened from said caps, may be taken up by these housings, the platter may be pivoted by one step to bring new contact tips to face said caps, which new contact tips may then be fixed in turn by brazing to the respective welding caps of the electrodes, following which the gripper, thus re-equipped, may be returned to the welding position until the next exchange cycle.

The operation of such a machine will be described later; it should be emphasized that this operation may of course be entirely automated and conveniently incorporated in the usual welding cycles.

Methods for implementing the invention will now be described by way of non-limiting examples with reference to the figures of the appended drawing in which:

FIG. 1 represents, in elevation and with sectioned parts, two resistance-welding electrodes in accordance with the invention;

FIG. 2 is a plan view of the inside of a contact tip with a brazing ring;

FIG. 2a shows a contact tip variant with a flat brazing ring;

FIG. 2b shows this contact tip brazed to a welding cap;

On all the figures the same references have been used to designate the same elements of the electrodes or similar elements.

Figure 3:
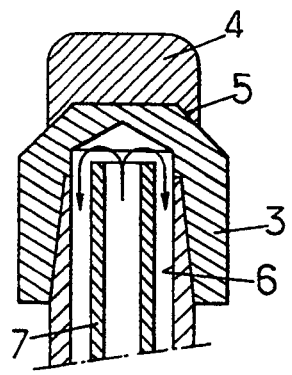
FIG. 3 is a view, in axial section, of the welding cap of an electrode in accordance with the invention, equipped with a brazed contact tip.

The reference 1 denotes the electrode body, which may be fixed by any appropriate means to a support arm 2 forming, for example, part of a two-armed welding gripper manipulated by a robot on a spot-welding line, for example for vehicle bodywork metal sheets or the like. These metal sheets have been referenced T in FIG. 1. As is known, the point fastening of the two metal sheets in question is carried out by fusion F of the metal at their point of contact, which fusion is caused by the passage of an electric current of high intensity between two opposing electrodes which press the metal sheets T together upon closure of the welding gripper under a controlled pressure.

The welding cap has been referenced 3, and may be fixed by a self-tightening tapered press fit onto the electrode body 1 or could even form part of this body. In accordance with the invention, the contact tip 4, namely the tip of the electrode which will be pressed onto the metal sheets T, instead of forming a single component with the welding cap 3, is securely fastened to the latter by brazing. For this purpose, the contact tips 4 are provided with a brazing ring referenced 5 in FIG. 2 and in the sectioned part of FIG. 1.

In the embodiment variant of FIGS. 2a and 2b, instead of using a conical brazing ring 5, a flat brazing ring 5a is used which is engaged over a contact tip 4a having, around a conical collet 5b, a flat seat 5c of corresponding dimensions. Thus, it is easy to ensure secure fastening between this brazing ring 5a and the contact tip 4a by clipping the ring onto said collet 5b, or by welding the ring onto the flat seat 5c by spot welds. This variant also has the advantage, over the embodiment of FIG. 1, of making the contact tips 4a easier to manufacture, for example by being cut on a lathe from a copper bar.

Whatever the embodiment, it can be seen that when the contact tips 4 are worn or deteriorated, it is very easy to withdraw them from the corresponding welding caps 3 by closing the gripper preferably on a special resistive plate T' (see FIG. 6), by interrupting the circulation of the cooling water, and by passing through the electrodes a current of sufficient intensity and duration to cause the brazing 5 to fuse. The gripper is then opened and the worn tips 4 are withdrawn and new tips 4 are laid down on the corresponding tips of the welding caps 5. It is then sufficient to close the gripper again on the plate T', with the circulation of cooling water still interrupted, and then to pass a high intensity current through the electrodes again so as to melt the brazing ring 5 of the new tips 4 and thus ensure their rigid attachment to the corresponding caps 3. After the current in the electrodes has been interrupted, a period may, moreover, be provided during which the pressure of the gripper is maintained on the plate T' to allow the brazing to cool sufficiently before the pressure on the plate T' is removed and the gripper is returned to the line for welding the metal sheets T.

Figure 4:
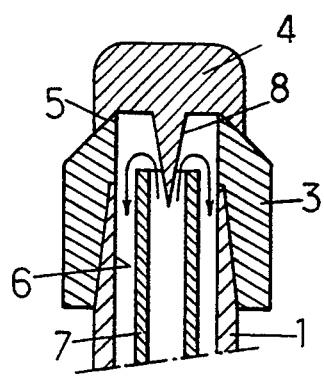
FIG. 4 shows a variant according to which, in contrast to the case of FIG. 3, the internal bore of the cap emerges directly onto the contact tip, the latter being provided with a conical central peg.
Figure 5:
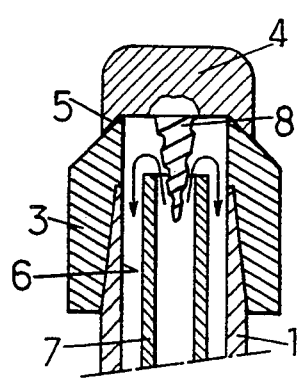
FIG. 5 is a variant of the embodiment of FIG. 4 in which the conical peg of the contact tip comprises a helical groove.

In FIG. 1, as in FIGS. 4 and 5, a variant has been represented according to which the internal bore 6 of the caps 3, which serves to evacuate the cooling water brought to the tip of the electrode by an internal duct 7, emerges directly on the bottom of the corresponding welding tip 4. In the embodiment of FIG. 3, on the other hand, the welding cap 3 is closed and the contact tip 4 is then cooled by conduction between the contact surfaces of this tip and of the welding cap 3. This embodiment makes it possible to avoid complete draining of the cooling circuit before exchanging the worn tip 4 for a new tip.

The embodiment of FIGS. 4 and 5 necessitates such a prior draining, but, on the other hand, makes it possible to provide, at the center of the contact tips 4, a conical peg 8 (FIG. 4), possibly provided with a helical groove (FIG. 5), in order to promote heat exchanges between the water coming from the internal duct 7 and the bottom of the corresponding contact 4.

Figure 6:
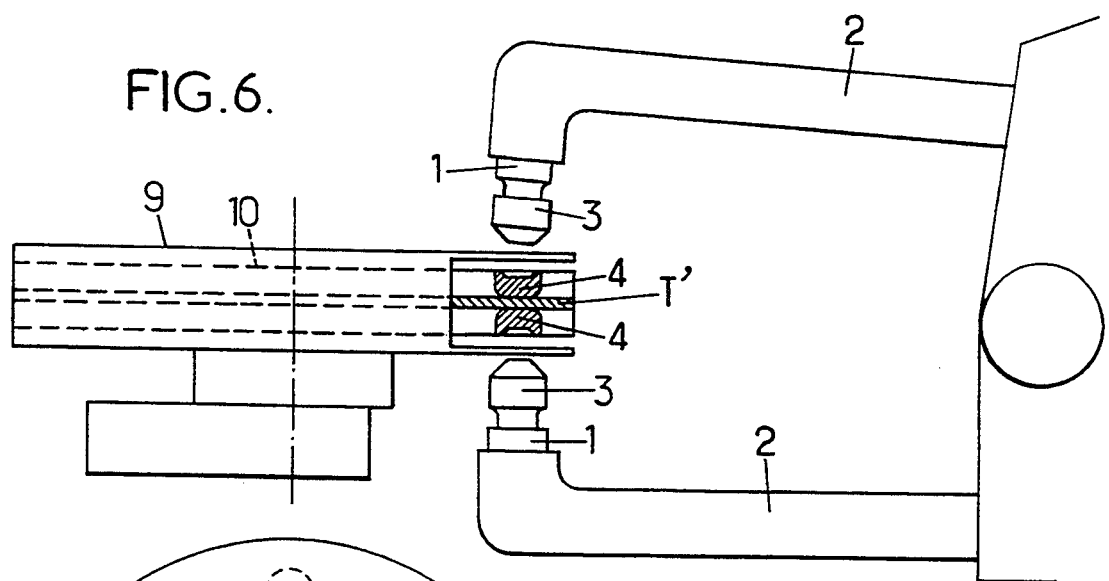
FIG. 6 is a diagrammatic view in elevation of a machine in accordance with the invention.
Figure 7:
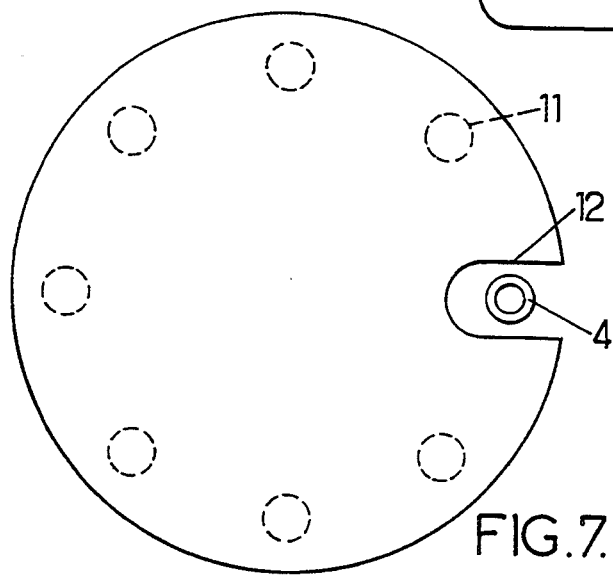
FIG. 7 is a partial plan view showing the revolving platter of this machine.

Changes of contact tips may easily be automated by virtue of a machine such as the one which is represented diagrammatically in FIGS. 6 and 7.

Figure 8:
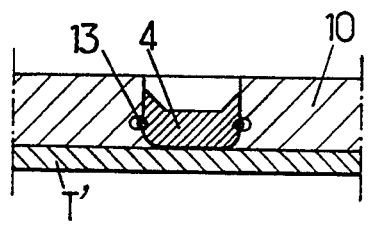
FIG. 8 shows the detail of the diagram of FIG. 6.

In these figures, the support arms carrying the electrode bodies 1 have also been referenced 2, which electrode bodies 1 in turn support at their respective ends the welding caps 3, this having been represented in FIG. 6 after the corresponding contact tips 4 have been unfastened. The replacement contact tips may be arranged opposite one another in a number of housings 11 provided on a revolving platter 10 rotationally driven by a stepper motor or jack. A mechanical holding device with clips 13 or jaws makes it possible to hold the contact tips 4 in place in their housings (FIG. 8). In this way, when the motor has been stopped in a position for which the two new tips 4 are facing the welding caps 3, via an opening 12 provided in a protection cap 9 for the revolving platter, it can be seen that they can very rapidly be fixed to the caps 3 by closing the gripper 2—2 so that the caps fit via their conical part in the corresponding conical part of the contact tips 4, following which, with the circulation of the cooling water stopped, it will be sufficient to pass through the electrodes a current of sufficient intensity and duration to melt the brazing rings 5 and thus rigidly attach the contact tips to the respective caps 3.

With these operations finished, the gripper 2—2 is reopened and it can then be returned to the line for welding the metal sheets T.

FIG. 6 also shows at T' the special resistive plate, for example made of graphite or of stainless steel, which makes it possible rapidly to increase the temperature of the caps 4 [sic] without needing a current of excessive intensity in the electrodes.

When it again becomes necessary to change the contact tips, the gripper will be returned to the position of FIG. 6 and in the meanwhile the platter 9 [sic] will have been revolved, for example by one step, in order to bring the new contact tips 4 opposite the caps 3, whilst the previously extracted worn tips will occupy other housings 11 of the platter 10. When this platter is completely full of worn contact tips and no longer comprises new contact tips, it will be sufficient to empty it and to refit it with new contact tips, or to dismantle the platter and replace it by another platter which has previously been reloaded with new contact tips, in order to save time.

It should be noted that various time-temperature pairings can of course be envisaged in order to produce the fusion of the brazing ring 5, either for withdrawing a worn contact tip or for putting in place a new contact tip. Thus the optimum conditions can easily be obtained so as to minimize the time necessary for the abovementioned operations whilst avoiding degrading the mechanical properties of the welding caps 3 which would lead to these caps being heated excessively.

It is known that in certain configurations the robot does not manipulate the welding gripper 2—2 as has been assumed in the case of FIG. 6, but, on the other hand, displaces the metal sheets T, the gripper 2—2 then being fixed with respect to the ground. It goes without saying that in such a case the general principle of the machine which has just been described is still valid, it only being necessary to provide for the robot to be able to grasp the device for exchanging the contact tips so as to present it in front of the gripper, and especially to bring the platter 10 into the position which it occupies in FIG. 6 with respect to the gripper 2—2. The dispensing platter 10 could also be mounted on a manipulator arm associated with the gripper body or with the gripper support, this arm then automatically bringing the platter between the gripper arms when the contact tip exchange procedure is activated.

It may also be envisaged in certain situations (machine gripper, manual gripper) for an operator to manually grasp the tip exchange device, position it between the electrodes of the gripper, and initiate the unbrazing and rebrazing operations for the contact tips. In this case exchange tools could be constructed which are better matched to this situation (lightweight, handleable).

Figure 9:
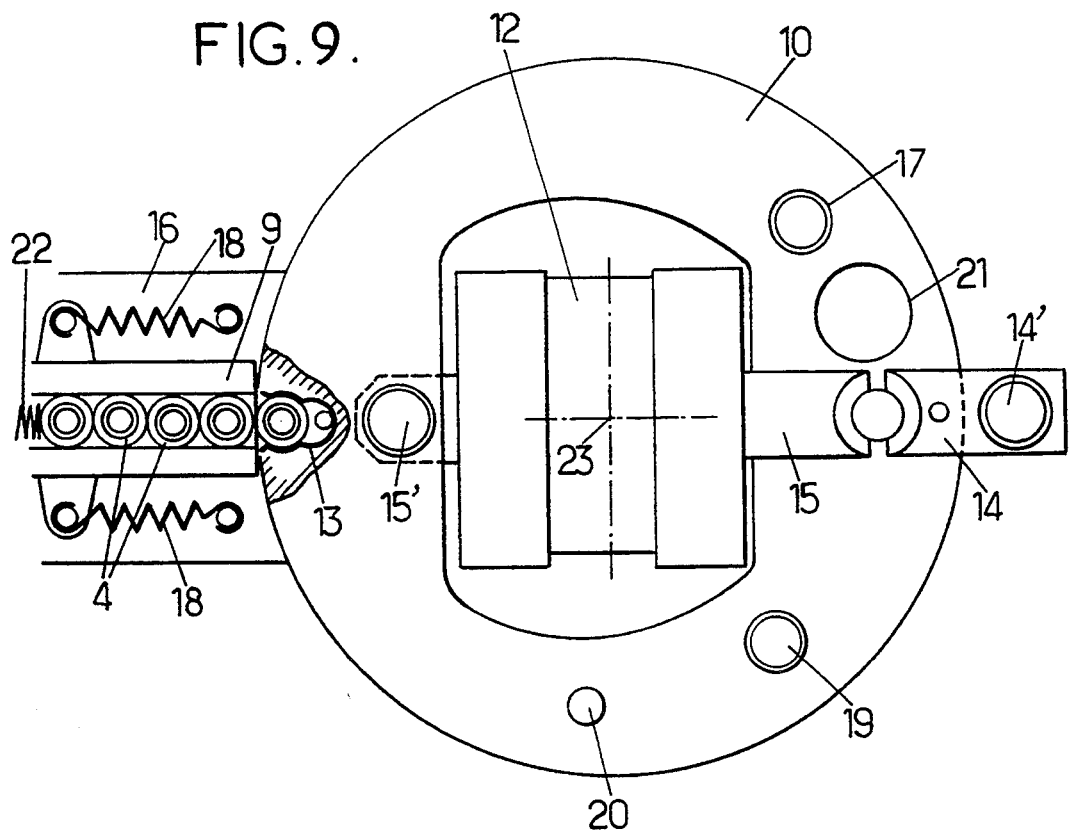
FIG. 9 is a diagrammatic plan view of another type of machine in accordance with the invention.
Figure 10:
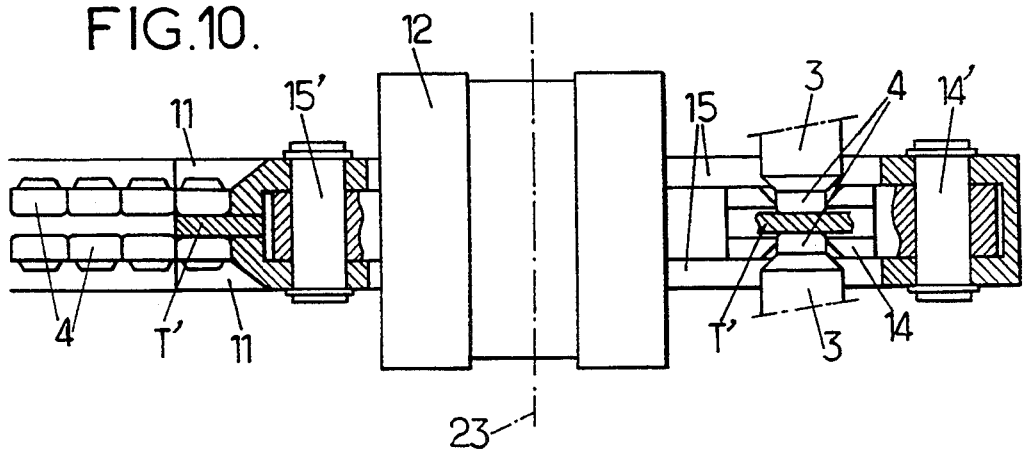
FIG. 10 is a diagrammatic view with partial axial sections of the machine of FIG. 9.

The machine represented by way of a variant in FIGS. 9 and 10 is improved with respect to that which has just been described, both in terms of its operational speed and in terms of the correct execution of the operations for unbrazing the worn contact tips.

It should be recalled that, in order to perform an unbrazing operation, it is necessary to close the electrodes 1 again on a resistive plate T' and to keep them in this position during the entire time that the unbrazing current flows and whilst subjecting them to a well defined force, of the order of 150 to 200 daN. Of course, the removal of the worn contact tips 4 can only be performed after the gripper 2—2 has been reopened. Now, it has been ascertained that the time, of the order of 100 to 150 ms, which elapses between the moment at which the unbrazing current is stopped, with simultaneous opening of the electrodes, and the moment at which the electrodes 1 are effectively open, which time corresponds to the response time of the electric distributors opening the gripper 2—2 and to the time for air to be inlet into the jack, was sufficient for the brazed and melted joint (between the contact tip 4 and, for example, a cap 3) to cool and to tend to resolidify the brazing, which then prevents the normal removal of the worn tip in question.

Another problem has appeared, which relates to the capillarity of the melted brazing, this phenomenon tending to hold an unbrazed contact tip 4 on the cap 3, even if the capillarity forces in question are relatively low, this being due to the low weight of the contact tips 4.

The improved machine which will now be described makes it possible to solve these two problems.

This machine is essentially one which, for this purpose, comprises a revolving platter coupled to stepwise drive motor means, this platter being combined:

a) with a station for loading new contact tips, said platter comprising, for this purpose, at least one loading cell suitable for receiving a new contact tip when it stops opposite said station, and b) with a station for brazing-unbrazing new and worn contact tips respectively, the machine comprising, for this purpose, at least one pair of jaws suitable for grasping a contact tip during unbrazing, and said brazing-unbrazing station comprising a resistive plate on which said contact tip may rest and allowing the passage of the brazing or unbrazing current through this tip, and wherein the various members of the machine are combined with automatic sequential control means ensuring that an operation for loading new contact tips at said loading station is carried out during an operation for unbrazing worn tips at said brazing-unbrazing station, and wherein said loading cell, equipped with at least one new contact tip, then comes, by a rotation of said platter, into the vicinity of said brazing-unbrazing station, so that said new tip can be brazed onto the electrode which has previously had its worn contact tip removed.

Thus the jaws which have just been mentioned will make it possible to overcome the capillarity forces which would otherwise tend to hold an unbrazed contact tip as it were bonded to the corresponding cap. By virtue of the jaws, when the corresponding electrode 1 is moved away from the resistive plate T' it will not take with it the contact tip 4, the latter then being held clamped between the two jaws.

Moreover, the machine which has just been defined in its most general form also makes it possible to solve the problem of the response times for the electric distributors and for the jack because it makes it possible to anticipate the opening of the welding gripper with respect to the moment at which the unbrazing current is cut off, this being by virtue of appropriate programming of said automatic sequential control means.

Also, of course, these sequential control means will be arranged so that the unbrazing current is cut off immediately before the resistive plate and the worn contact tips break contact, in order to avoid an electric arc being produced which would be prejudicial to the service life of the electrode caps.

The machine represented in FIGS. 9 and 10 essentially comprises a support 16 carrying a platter 10 suitable for pivoting about a rotation axis 23. This platter may be rotationally driven stepwise by any motor means, not shown, for example using a jack or the like. The loading station mentioned above and situated to the left of FIGS. 9 and 10 essentially comprises a loader 9 arranged radially with respect to the revolving platter 10 and in which new contact tips 4 are elastically forced towards said platter 10 by springs 18 acting on the loader, and by a spring 22 pressing this stack of tips 4 radially into said loader. In the position which is represented in the figures, this loading station, and more exactly the loader 9 which has just been mentioned, are opposite two loading cells 11 of the platter, in which cells two contact tips 4 may be held opposite one another by virtue of an elastic clip 13. The platter 10 is circular but is slightly off-centered with respect to its rotation axis 23, so that this introduction of the contact tips 4 in the loading cells 11 from the loader 9 is carried out automatically in the position represented in the figures, while the loader 9 is pushed back radially towards the outside by the platter when the latter occupies a position pivoted through 180° with respect to that which is shown.

It should be noted that the system of loader 9 and springs 18 and 22 could be replaced by any other equivalent system, for example a cam, a small pneumatic jack, or even a manual positioning, in the case in which the contact tips are replaced less frequently.

It is, moreover, observed that the elastic clip 13 is perfectly matched to holding two contact tips in the loading cells 11, for example on the resistive plate T', regardless of the orientation of the machine in space.

Opposite the loading station which has just been described is located the brazing-unbrazing station. This station essentially comprises two jaws, namely a fixed jaw 14 and a jaw 15 which is movable and is mounted on the platter 10, it being possible to actuate the movable jaw radially via a pneumatic jack or the like 12, and these two jaws also being capable of pivoting slightly, the movable jaw about a pin 15' and the fixed jaw about a pin 14', so as to be able perfectly to match the contact tip 4 in question.

The operation of such a machine may be as follows: the initial position of the platter being assumed to be that which is represented in the figures, the gripper 2—2 is closed around the resistive plate T', so that the two electrodes 1 are pressed against one another against this plate by means of their respective worn contact tips 4. The unbrazing current then passes through the electrodes and causes the fusion of the brazing of the contact tips. Shortly before the unbrazing current passing through the electrodes 1 is cut off, the command is given for the gripper 2—2 to open, so that opening occurs practically without any delay as soon as the unbrazing current is cut off. Since the jaws 14, 15 grasp the worn contact tips thus detached from the welding caps, the moving apart of the electrodes is not likely to entrain the tips 4 by capillarity of the melted brazing, and the jaws may consequently be opened. The platter is then set in rotation in the clockwise direction, bringing about the beginning of the removal of the worn contact tips: during this first rotation of the platter 10, first proximity detectors 19 make it possible to verify the presence of the worn contact tips 4 being removed, and second proximity detectors 17 make it possible to verify the presence of new contact tips 4 being transferred to the brazing-unbrazing station from the loading station. During this rotation, as indicated above, the loader 9 is pushed back towards the rear and the unloading station passes in front of the removal studs 20 serving as a stop for the unbrazed contact tips, which may then be removed via an opening 21 of the platter situated immediately behind the unbrazing station. When the unbrazing station comes opposite the loader 9, the two new contact tips 4 which had been loaded at the beginning into the loading cells 11 reach the brazing-unbrazing station and can then be automatically brazed onto the welding caps 3, here again by supplying the electrodes 1 with current and pressing the contact tips onto the resistive plate T'. When the operations for brazing the new contact tips are finished, the platter undergoes a second rotation through 180° in the counterclockwise direction, so as to be returned to its initial position for loading the new tips into the cells 11, the brazing-unbrazing station also then itself being returned to its initial position.

It should be noted that during this second rotation through 180° the loading station passes back in front of the position detectors 17, which makes it possible to check that the loading cells 11, which have returned to the loading station, are empty; likewise for the proximity detectors 19 relating to the unloading station of the platter.

Finally, it should be mentioned that the machine which has been described makes it possible to mount possibly different tips on the upper electrode and lower electrode of the-gripper. The articulation of the fixed and movable jaws 14 and 15 is not absolutely indispensable but makes it possible to self-center them conveniently, when they are being shut, on the worn contact tips 4.

We claim:

1. A spot resistance-welding electrode comprising:
    an electrode body mounted on a support arm and connected to a high intensity welding current source as well as to a cooling water supply circuit,
    a welding cap securely fastened to an end of said body, said cap having
        a consumable contact tip which ensures contact with metal sheets to be welded and which transmits to the sheets a welding current pressure and welding current intensity, wherein said contact tip of the welding cap is a distinct component of the cap which is replaceable after said contact tip is consumed, said contact tip including a helical deflecting peg which is centrally and internally located therein,
        a brazing which connects said cap to said tip, said brazing having been produced, and later during replacement of the contact tip capable of being destroyed, by passing a current necessary for melting a brazing material located between said contact tip and a remainder of said welding cap from the welding current source.

2. The electrode as claimed in claim 1, and further including a fixing means for fixing said welding cap in a removable fashion to the end of said body.

3. The electrode as claimed in claim 2, wherein said fixing means is a tapered press fit between said welding cap and the end of said body.

4. The electrode as claimed in claim 1, wherein said welding cap forms an integral part of the electrode body.

5. The electrode as claimed in claim 1, wherein said contact tip includes a conical part and an end of said welding cap includes a complementary shaped portion for receiving said conical part, and wherein said brazing is located between said conical part and said complementary shaped portion.

6. A machine for exchanging contact tips on electrodes wherein each electrode comprises an electrode body mounted on a support arm and connected to a high intensity welding current source as well as to a cooling water supply circuit and a welding cap securely fastened to an end of said body, said cap having (a) a consumable contact tip which is a distinct component of the cap and whose role is to ensure contact with metal sheets to be welded and to transmit to the sheets a welding current pressure and welding current intensity, and (b) a brazing which connects said cap to said tip which is produced by passing a current necessary for melting the brazing from said welding current source, said machine comprising:
    a loading station for loading new contact tips;
    a revolving platter and a stepwise drive motor means coupled to said platter for driving said platter in rotation, said platter comprising at least one loading cell for receiving a new contact tip when said platter stops opposite said loading station;
    a brazing-unbrazing station for brazing-unbrazing new and worn contact tips respectively, said brazing-unbrazing station comprising a resistive plate on which said contact tip rests and which allows the passage of the brazing or unbrazing current through this contact tip;
    at least one pair of jaws suitable for grasping a contact tip during unbrazing; and
    an automatic sequential control means for controlling said loading station, said revolving platter and said drive motor means, said brazing-unbrazing station, and said at least one pair of jaws and for ensuring that an operation for loading new contact tips at said loading station is carried out during an operation for unbrazing worn tips at said brazing-unbrazing station, and wherein said loading cell, equipped with at least one new contact tip, then comes, by a rotation of said platter, into the vicinity of said brazing-unbrazing station, so that said new tip is brazed onto the electrode which has previously had the worn contact tip removed.

7. The machine as claimed in claim 6, wherein said loading station comprises a loader arranged radially with respect to said revolving platter and a forcing means in said loader for forcing said new contact tips elastically towards said platter.

8. The machine as claimed in claim 7, wherein said loading cell comprises an elastic clip which is open towards said loader and able to receive and to hold elastically at least one new contact tip.

9. The machine as claimed in claim 6, wherein said brazing-unbrazing station comprises a fixed jaw, a jaw which is movable, and respective means for allowing pivoting of said jaws.

10. The machine as claimed in claim 6, wherein said loading and brazing-unbrazing stations are diametrically opposed with respect to said platter, and wherein, after an operation for unbrazing worn contact tips, said sequential control means further ensures a first rotation of said platter suitable for bringing the new contact tips from said loading station to said brazing-unbrazing station during which displacement the unbrazed tips are removed, the operation for brazing said new tips onto the electrodes, and a second rotation of said platter in the opposite direction, to return it to its initial position for loading new tips at said loading station.

11. The machine as claimed in claim 10, wherein, during said first rotation of the platter, first proximity detectors verify the presence of the worn contact tips being removed, and second proximity detectors verify the presence of new contact tips being transferred to the brazing-unbrazing station.

12. The machine as claimed in claim 6, wherein said automatic sequential control means further ensures anticipation of the opening of the support arm carrying said electrodes with respect to the moment at which the unbrazing current is cut off, this cutoff occurring immediately before said resistive plate and the worn contact tips break contact.

13. A method for changing a distinct contact tip of a spot resistance-welding electrode wherein the electrode comprises (a) an electrode body connected to a high intensity welding current source as well as to a cooling water supply circuit and (b) a welding cap securely fastened to an end of the body to which the contact tip is attached by a brazing between the cap and the contact tip, the contact tip being consumable and acting to ensure contact with metal sheets to be welded and to transmit to the sheets a welding current pressure and welding current intensity, said method comprising the steps of:

melting the brazing by passing a current necessary for melting the brazing from the welding current source through the contact tip;

removing the contact tip from the cap while the brazing is melted;

positioning a new contact tip with a new brazing material adjacent the welding cap; and melting the new brazing material by passing a current necessary for melting the new brazing material from the welding current source through the new contact tip, whereby the new contact tip is attached to the welding cap by a new brazing.

14. A method for changing a contact tip as claimed in claim 13 wherein said positioning step includes the step of initially providing the new contact tip with a brazing ring which forms the new brazing material.

15. A method for changing a contact tip as claimed in claim 14 wherein the contact tip includes a conical part and an end of the welding cap includes a complementary shaped portion for receiving the conical part, and wherein said providing step includes the step of forming said brazing ring on said conical part.

16. A method for changing a contact tip as claimed in claim 14 wherein said providing step includes the step of clipping the brazing ring securely to the contact tip.

17. A method for changing a contact tip as claimed in claim 14 wherein the contact tip includes a seat, and wherein said providing step includes the step of applying the brazing ring to the seat.

18. A method for changing a contact tip as claimed in claim 17 wherein said providing step includes the step of spot welding the brazing ring securely to the contact tip. and

* * * * *